US010076816B2

(12) United States Patent
Bretschneider

(10) Patent No.: US 10,076,816 B2
(45) Date of Patent: Sep. 18, 2018

(54) METHOD AND DEVICE FOR MACHINING THE BLADE TIPS OF A COMPRESSOR ROTOR OF A GAS TURBINE

(71) Applicant: Rolls-Royce Deutschland Ltd & Co KG, Blankenfelde-Mahlow (DE)

(72) Inventor: Andre Bretschneider, Blankenfelde-Mahlow (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 320 days.

(21) Appl. No.: 14/857,173

(22) Filed: Sep. 17, 2015

(65) Prior Publication Data

US 2016/0082560 A1    Mar. 24, 2016

(30) Foreign Application Priority Data

Sep. 22, 2014   (DE) ........................ 10 2014 219 050

(51) Int. Cl.
*B23P 6/00* (2006.01)
*B23C 3/18* (2006.01)
(Continued)

(52) U.S. Cl.
CPC ................ *B23Q 11/08* (2013.01); *B23C 3/18* (2013.01); *B23P 6/002* (2013.01); *B23P 15/006* (2013.01); *B23Q 11/0866* (2013.01); *B24B 19/14* (2013.01); *F01D 5/005* (2013.01); *F01D 5/141* (2013.01); *F01D 5/147* (2013.01);
(Continued)

(58) Field of Classification Search
CPC ..... B23C 3/18; B23Q 11/0866; B23P 15/006; B23P 6/002; F01D 5/005; F01D 5/147; F01D 5/141; F01D 25/285; B24B 19/14; Y10T 29/49318; Y10T 29/49998
See application file for complete search history.

(56) References Cited

U.S. PATENT DOCUMENTS

| 4,741,128 A | 5/1988 | Reaves et al. |
| 8,353,105 B2 | 1/2013 | Secherling et al. |

(Continued)

FOREIGN PATENT DOCUMENTS

| CN | 202512746 U | * | 3/2013 |
| DE | 19921198 C1 | | 6/2000 |
| DE | 102007041805 A1 | | 3/2009 |
| DE | 102008062364 A1 | | 6/2010 |
| DE | 102013107497 A1 | | 1/2015 |
| EP | 1775067 A1 | | 4/2007 |
| EP | 2730370 A1 | | 5/2014 |

OTHER PUBLICATIONS

European Search Report dated Feb. 2, 2016 for counterpart European Application No. 15178500.3.
(Continued)

*Primary Examiner* — Jermie Cozart
(74) *Attorney, Agent, or Firm* — Shuttleworth & Ingersoll, PLC; Timothy J. Klima

(57) ABSTRACT

A method and a device for processing blade tips of a mounted compressor rotor of a gas turbine. The compressor rotor includes a blade row with blades to be processed, and a blade row with blades that are not to be processed. The blade row not to be processed is accommodated in a stationary protective housing, which encloses the blade row. The blade row to be processed is processed by a processing machine during a rotation of the compressor rotor.

14 Claims, 5 Drawing Sheets

Figure 1:
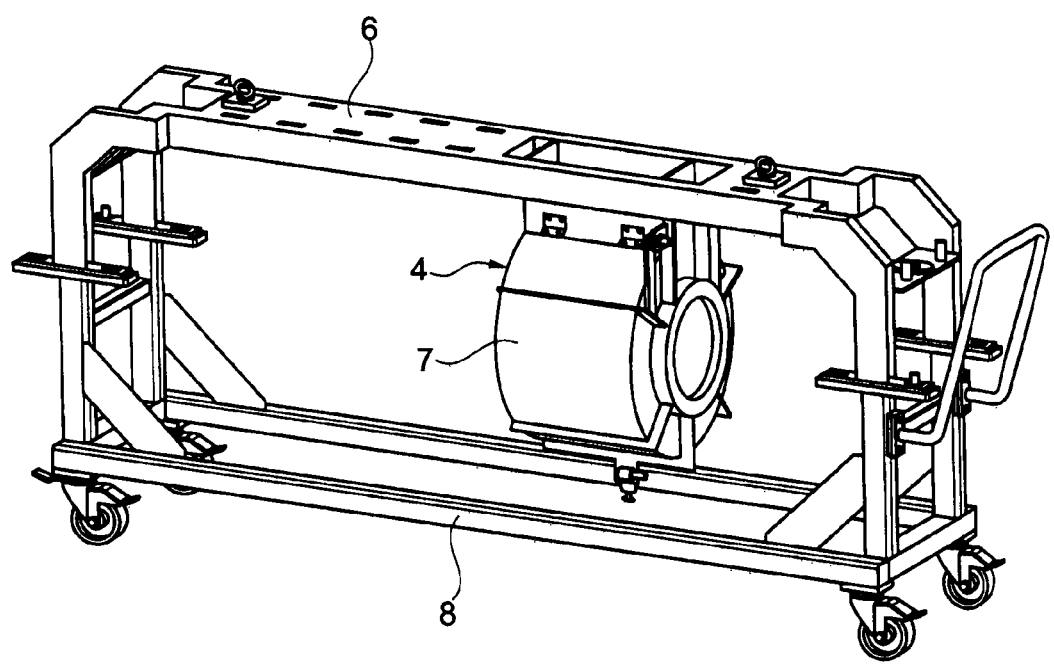

(51) Int. Cl.
  *B23Q 11/08* (2006.01)
  *F01D 5/14* (2006.01)
  *B24B 19/14* (2006.01)
  *B23P 15/00* (2006.01)
  *F01D 25/28* (2006.01)
  *F01D 5/00* (2006.01)

(52) U.S. Cl.
  CPC ........ *F01D 25/285* (2013.01); *F05D 2230/10* (2013.01); *F05D 2230/18* (2013.01); *F05D 2230/72* (2013.01); *F05D 2230/80* (2013.01); *Y10T 29/49318* (2015.01); *Y10T 29/49998* (2015.01)

(56) References Cited

U.S. PATENT DOCUMENTS

| | | | |
|---|---|---|---|
| 2008/0011932 A1* | 1/2008 | Stretton | B66C 1/10 248/544 |
| 2009/0294625 A1* | 12/2009 | Fernley | F01D 25/285 248/671 |
| 2014/0134926 A1 | 5/2014 | Groppe et al. | |

OTHER PUBLICATIONS

German Search Report dated May 11, 2015 from counterpart App No. 10 2014 219 050.9.

\* cited by examiner

METHOD AND DEVICE FOR MACHINING THE BLADE TIPS OF A COMPRESSOR ROTOR OF A GAS TURBINE

This application claims priority to German Patent Application DE102014219050.9 filed Sep. 22, 2014, the entirety of which is incorporated by reference herein.

The invention relates to a method and a device for processing blades, in particular blade tips, of a mounted compressor rotor of a gas turbine.

It is known in the state of the art to process rotors of gas turbines, for example for the purpose of grinding the blade tips of compressor blades. Gas turbine compressors usually have different blade rows. On the one hand, these are blisks, in which a disc is configured in one piece with the blades. Such blisks can be finished before mounting and do not need to be reworked in the mounted state of the compressor rotor. Another design of compressor rotors includes at least one or multiple blade rows comprising separately mounted blades, which are anchored at a disc. Due to the mounting tolerances, manufacturing tolerances or the like, it is necessary to rework the blade tips of the individual blades of the at least one blade row in the mounted state, in particular to grind them. However, through flying sparks that may occur during this grinding process, damages to the blisks or blades may occur.

In the state of the art it is known to apply a protective varnish or a coating to the blade rows that are not to be processed, in particular blisks, before the other blades of the at least one blade row to be processed are mechanically processed. This application of a protective varnish or a coating requires elaborate work steps at the mounted compressor rotor. So it is necessary to first degrease the blades that are not to be processed. Subsequently, they are varnished and dried. Now, after the protective varnish or the coating has been applied, the work on the other blades may ensue. Subsequently, it is necessary to clean the blades not to be processed and to remove the protective varnish. These processes require a considerable amount of time and entail high costs.

The invention is based on the objective to create a method as well as a device that is suited to perform the same, of the kind as has been initially mentioned, by means of which processing of blades, in particular of the blade tips of a mounted compressor rotor of a gas turbine, is facilitated in a manner that is time-saving and also gentle on the components.

The objective is solved by a combination of features disclosed herein, with the present disclosure showing further advantageous embodiments.

According to the invention, it is thus provided with respect to the device that the processing of the blades, in particular of blade tips of a mounted compressor rotor of a gas turbine, is carried out by means of a processing machine. This processing machine may for example be a grinding or milling machine, in which the compressor rotor is mounted. Here, the compressor rotor is set in rotation, so that the blade tips of the respective blade rows can be processed by means of a grinding tool. The device according to the invention comprises a protective housing, which encloses and encapsulates the at least one blade row not to be processed. According to the invention, the protective housing is arranged in a stationary manner, so that it does not spin with the compressor rotor. Rather, the protective housing is preferably mounted at the processing machine. Thus, the protective housing encloses the at least one blade row not to be processed and encapsulates it, so that during processing of the at least one blade row to be processed, the flying sparks that may occur in the course of the procedure do not damage the blades not to be processed.

In a particularly advantageous embodiment of the invention it is provided that the protective housing is attached or arranged at a bearer frame. Together with the protective housing, the bearer frame can be positioned on the processing machine or mounted at the same in a precise manner. In this way it is ensured that the prescribed tolerances are complied with and that the blades that are encapsulated in the protective housing do not touch the protective housing during the rotation of the compressor rotor.

In order to mount the protective housing and to encapsulate the at least one blade row not to be processed, which, as mentioned, can for example be configured in the form of a blisk, it is particularly advantageous if the protective housing comprises moveable housing parts which are foldable or pivotable. Thus, after the positioning of the bearer frame on the compressor rotor, preferably before or after the mounting of the compressor rotor to be processed in the processing machine, an exact positioning of the protective housing through the contact surfaces and guideways is predefined relative to the compressor rotor. Thanks to the moveable housing parts, which may be configured as pivotable housing parts or in a similar way, it is thus possible to arrange the blades not to be processed inside the protective housing and to encapsulate them without any danger of damages.

As has been mentioned, according to the invention the protective housing is attached at the processing machine in a stationary manner. In this manner it is possible to provide very narrow tolerances, sealing material or clearances of the protective housing with regard to the blades not to be processed. In this manner, it is prevented that any particles, in particular sparks and foreign matter, enter the interior of the protective housing.

As for the methods according to the invention, it follows from the above description of the device that according to the method at least one blade row not to be processed is accommodated in a stationary protective housing, and that subsequently the blades to be processed are processed by means of a processing machine during the rotation of the compressor rotor, for example by means of grinding or milling the blade tips.

In particular it is provided in the method according to the invention that the protective housing is mounted after the installation of the mounted compressor rotor in the processing machine, so that the at least one blade row not to be processed is encapsulated by the protective housing or is accommodated inside the same. Thus, it is not necessary according to the invention to cover the at least one blade row not to be processed by means of a protective varnish or in a similar manner, as it is known from the state of the art. Since the positioning and mounting of the protective housing can be carried out in a very short time, the total processing time is considerably shortened.

The protection of the areas of the compressor rotor that are not to be processed by means of the protective housing as it is provided according to the invention can also be provided in other areas of the compressor rotor, for example in order to protect or shield the rotor drum itself. In general, the invention may be applied in all processing procedures in which areas of a rotating structural component are processed while other areas have to be protected during the processing operation. So it is in particular possible according to the invention to use the protective housing not only as a cover against flying sparks, but in certain processing procedures also for the protection against cooling agents or lubricants, for the protection against foreign matter or for the purpose of thermal insulation.

According to the invention it is possible to either first install the compressor rotor to be processed in the processing machine and subsequently mount the bearer frame together with the protective housing. Or alternatively it is also possible to first support the compressor rotor at the bearer frame and to mount or to close the protective housing before the compressor rotor is installed in a processing machine together with the bearer frame.

Figure 2:
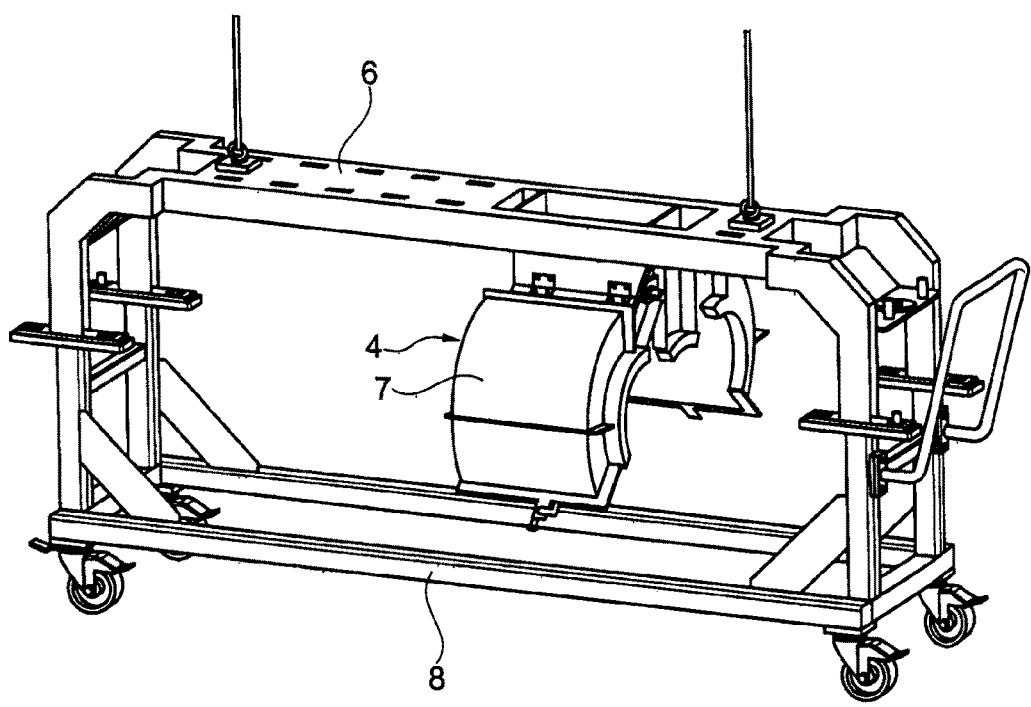
Figure 3:
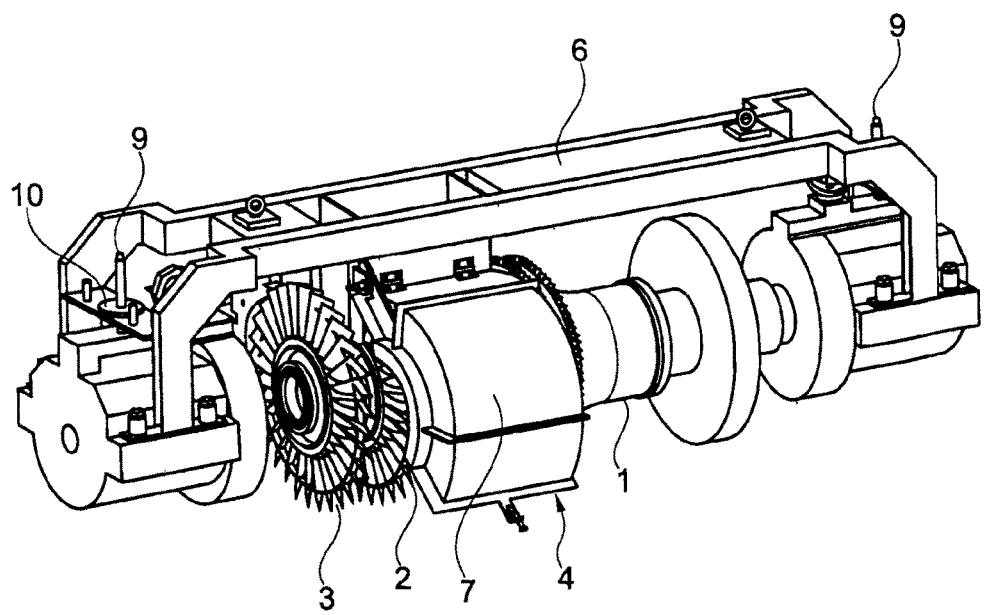
Figure 4:
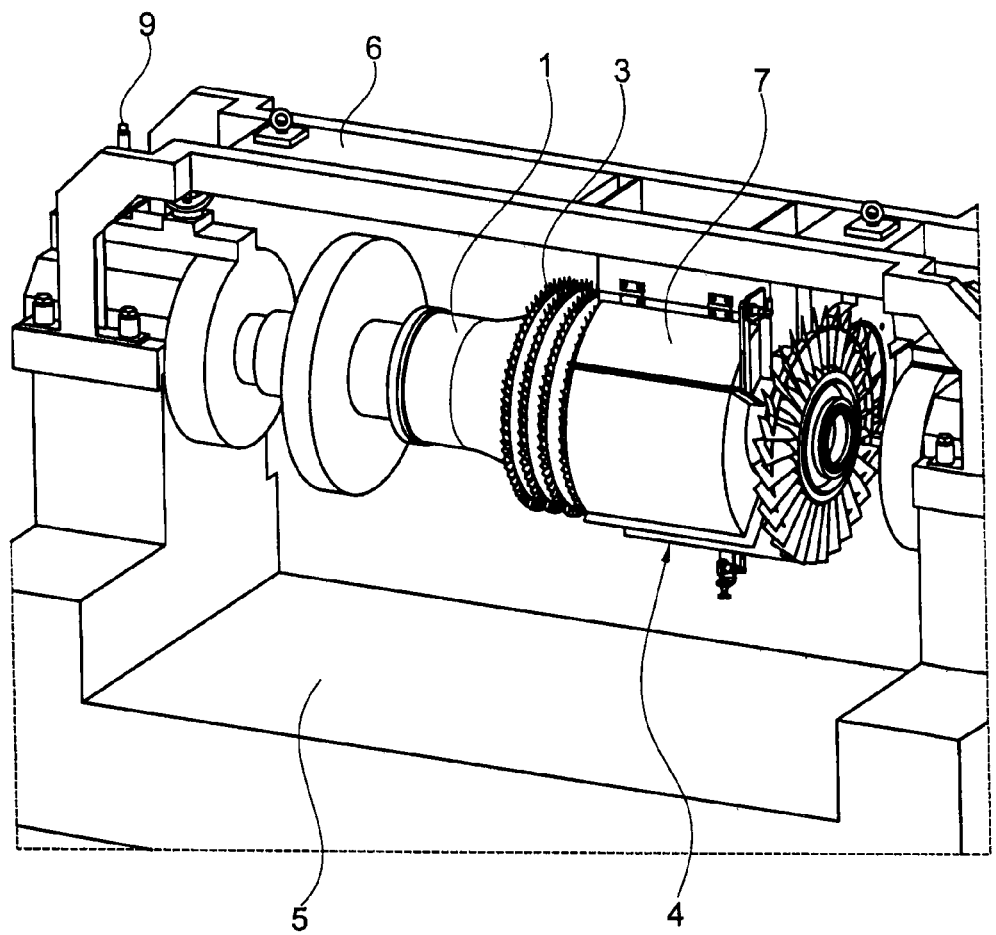
Figure 5:
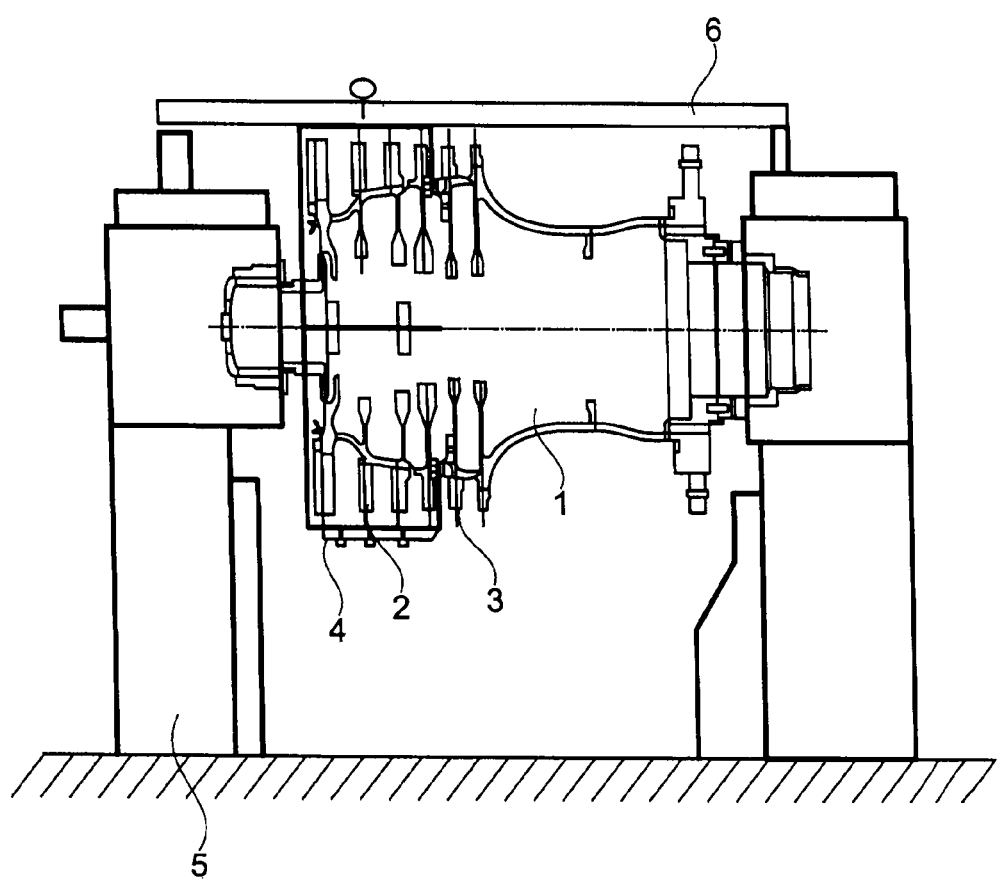

In the following, the invention is explained by referring to an exemplary embodiment in connection with the drawing. Herein:

FIG. 1 shows a perspective view of a closed protective housing with a bearer frame according to the invention, FIG. 2 shows a view, analogous to FIG. 1, with an opened protective housing, FIG. 3 shows a view, analogous to FIG. 2, with a compressor rotor and an opened protective housing, FIG. 4 shows a view, analogous to FIG. 3, with a closed protective housing, and FIG. 5 shows a simplified lateral section view, analogous to FIG. 4.

As can in particular be seen from the rendering of FIGS. 3 and 5, a mounted compressor rotor 1 of a gas turbine comprises blade rows not to be processed 2 as well as blade rows to be processed 3. The blade rows not to be processed 2 are configured in the form of blisks, for example, while the blade rows to be processed comprise individual blades that are attached at a rotor disc. During processing of the blade rows to be processed 3 by means of a grinding machine in particular sparks may be created, which may lead to damage to the blades not to be processed (blade row 2).

FIGS. 1 and 2 show a bearer frame 6, which is positioned on a trolley 8 for the purpose of transporting it. A protective housing 4 according to the invention is attached to the bearer frame 6. The pairing of protective housing 4 and bearer frame 6 is chosen in such a manner that the protective housing 4 is positioned in a precise manner with respect to the blade rows not to be processed 2 during mounting of the bearer frame 6 onto the processing machine 5 (see FIGS. 4 and 5).

FIG. 1 shows a protective housing 4 in the closed, completely mounted state, in which it serves for the enclosure of the blade rows not to be processed 2 during a processing operation. FIG. 2 shows an opened state of the protective housing 4. As can be particularly seen here, the protective housing 4 comprises two lateral housing parts 7, which are mounted in a pivotable manner. Thus, as shown in FIG. 3, it is possible to position the protective housing 4 relative to the compressor rotor 1 by means of alignment pins 9 and a spherical bearing 10 and to cover or encapsulate the blade rows not to be processed 2 by closing the housing parts 7. Thanks to the pivotability of the housing parts 7, it is avoided in a reliable manner that the protective housing 4 or the housing parts 7 come into contact with the blades of the compressor rotor 1. Thus, damages are completely excluded given correct handling.

FIG. 4 shows an operating status in which the compressor rotor 1 is positioned at a processing machine 5 together with the bearer frame 6 after the housing parts 7 have been closed and thus the encapsulation of the blade rows not to be processed 2 (see FIG. 3) has been effected. It can be seen that the housing part 7 remains stationary, while the compressor rotor 1 is set into rotation for processing.

FIG. 5 shows a view, analogous to FIG. 4, in a lateral section view. Here, the enclosure of the blade rows not to be processed 2 by the protective housing 4 can be seen once more, while the blade rows to be processed 3 are freely accessible and thus can be processed.

According to the invention, it is possible to provide seals or a sealing arrangement at the edge areas of the protective housing 4 in order to prevent particles, fluids and foreign matter from entering the interior of the protective housing 4 during the processing.

PARTS LIST

1 compressor rotor
2 blade row (not be processed)
3 blade row (to be processed)
4 protective housing
5 processing machine
6 bearer frame
7 housing part
8 transport trolley
9 alignment pin
10 spherical bearing

The invention claimed is:

1. A method for processing blade tips of a mounted compressor rotor of a gas turbine,
   providing that the compressor rotor comprises a first blade row with blades that are to be processed and a second blade row with blades that are not to be processed,
   accommodating the second blade row in a stationary protective housing which encloses the second blade row, and
   subsequently processing the first blade row with a processing machine while rotating the compressor rotor.

2. The method according to claim 1, and further comprising shielding the second blade row against flying sparks, particles, foreign matter or fluids with the protective housing.

3. The method according to claim 2, and further comprising supporting the protective housing on a bearer frame and positioning the protective housing with respect to the bearer frame.

4. The method according to claim 3, and further comprising providing that the processing operation is a grinding or milling process.

5. The method according to claim 4, and further comprising providing that the processing machine is a grinding or milling machine.

6. The method according to claim 1, and further comprising providing the protective housing with moveable housing parts and arranging the movable housing parts around the second blade row to enclose the blade row with the protective housing.

7. The method according to claim 6, and further comprising shielding the second blade row against flying sparks, particles, foreign matter or fluids with the protective housing.

8. The method according to claim 7, and further comprising supporting the protective housing on a bearer frame and positioning the protective housing with respect to the bearer frame.

9. The method according to claim 8, and further comprising providing that the processing operation is a grinding or milling process.

10. The method according to claim 9, and further comprising providing that the processing machine is a grinding or milling machine.

11. The method according to claim 1, and further comprising supporting the protective housing on a bearer frame and positioning the protective housing with respect to the bearer frame.

12. The method according to claim 1, and further comprising providing that the processing operation is a grinding or milling process.

13. The method according to claim 1, and further comprising providing that the processing machine is a grinding or milling machine.

14. A device for processing blade tips of a mounted compressor rotor of a gas turbine by a processing machine, comprising:
   a protective housing, for positioning over to enclose a blade row of the compressor rotor which has blades that are not to be processed by the processing machine;
   a bearer frame for mounting the protective housing, the bearer frame positionable on the processing machine for processing the compressor rotor;

wherein the protective housing comprises a first housing part including a first hinge pivotally mounting the first housing part to the bearer frame and an opposed second housing part including a second hinge pivotally mounting the second housing part to the bearer frame, the first and second housing parts respectively pivotable between 1) a closed position where portions of the first and second housing parts are pivoted toward each other to at least partially enclose a protective space between the first and second housing parts, the protective space shaped to receive the blade row of the compressor rotor, and 2) an open position where portions of the first and second housing parts are pivoted away from each other to provide an access opening to the protective space, the access opening being shaped to allow passage of the blade row of the compressor rotor between the protective space and an exterior of the protective housing.

* * * * *